United States Patent
Lee

(10) Patent No.: US 11,718,748 B2
(45) Date of Patent: Aug. 8, 2023

(54) COMPOSITION, METHOD FOR THE MANUFACTURE THEREOF, AND ARTICLES MADE THEREFROM

(71) Applicant: SHPP GLOBAL TECHNOLOGIES B.V., Bergen op Zoom (NL)

(72) Inventor: Jung Ah Lee, Cohoes, NY (US)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 17/923,112

(22) PCT Filed: May 5, 2021

(86) PCT No.: PCT/IB2021/053812
§ 371 (c)(1),
(2) Date: Nov. 3, 2022

(87) PCT Pub. No.: WO2021/245478
PCT Pub. Date: Dec. 9, 2021

(65) Prior Publication Data
US 2023/0121614 A1   Apr. 20, 2023

(30) Foreign Application Priority Data
Jun. 5, 2020 (EP) .................... 20178467

(51) Int. Cl.
*C08L 67/02* (2006.01)
(52) U.S. Cl.
CPC ........... *C08L 67/02* (2013.01); *C08L 2203/20* (2013.01); *C08L 2205/035* (2013.01)
(58) Field of Classification Search
CPC . C08L 67/02; C08L 2203/20; C08L 2205/035

USPC .......................................... 524/101
See application file for complete search history.

(56) References Cited

U.S. PATENT DOCUMENTS

| | | | |
|---|---|---|---|
| 7,829,614 B2 | 11/2010 | Ding et al. | |
| 2005/0137297 A1 | 6/2005 | De Wit | |

FOREIGN PATENT DOCUMENTS

| | | | |
|---|---|---|---|
| CN | 109897347 A | * | 6/2019 |
| CN | 109897347 A | | 6/2019 |
| WO | 2020005544 A1 | | 1/2020 |

OTHER PUBLICATIONS

International Search Report for the corresponding International Application No. PCT/IB2021/053812; International Filing Date: May 5, 2021; dated Oct. 12, 2021; 4 pages.
Written Opinion for the corresponding International Application No. PCT/IB2021/053812; International Filing Date: May 5, 2021; dated Oct. 12, 2021; 5 pages.

* cited by examiner

*Primary Examiner* — Ling Siu Choi
*Assistant Examiner* — Ronald Grinsted
(74) *Attorney, Agent, or Firm* — Cantor Colburn LLP

(57) ABSTRACT

A composition includes particular amounts of a poly(phenylene ether); a poly(alkylene terephtalate); a hydrogenated block copolymer of an alkenyl aromatic monomer and a conjugated diene; a compatibilizing agent; an arc suppressant comprising a nitrogen-containing compound, a phosphorus-containing compound, or a combination thereof; glass fiber, a mineral filler; and poly(tetrafluoroethylene). The composition can be particularly useful for use in molded circuit breakers.

20 Claims, No Drawings

COMPOSITION, METHOD FOR THE MANUFACTURE THEREOF, AND ARTICLES MADE THEREFROM

This application is a National Stage application of PCT/IB2021/053812, filed May 5, 2021, which claims priority to and the benefit of European Application No. 20178467.5, filed on Jun. 5, 2020, the contents of both of which are incorporated by reference herein in their entirety.

BACKGROUND

Poly(phenylene ether) compositions are commercially attractive materials because of their unique combination of properties, including, for example, high temperature resistance, dimensional and hydrolytic stability, low density, flame retardancy, and dielectric properties. Compositions including poly(phenylene ether)s and poly(alkylene terephthalate)s are useful in the manufacture of articles and components for a wide range of applications, from automotive parts to electronic appliances. Known mixtures of poly(phenylene ether)s and polyesters generally do not provide a sufficient balance of properties to make them commercially attractive for many applications. It is therefore apparent that a need exists for improved polyester-poly(phenylene ether) compositions, which overcome at least one of the aforementioned difficulties. Additionally, because of their broad use, particularly in miniature circuit breakers, it would be desirable to provide a composition which can exhibit effective arc-extinguishing and high tracking resistance properties, as well as meet the standards set by UL 489.

There accordingly remains a need in the art for poly(alkylene terephthalate)-poly(phenylene ether) compositions that exhibit the desired combination of mechanical and electrical properties, particularly for use in circuit breaker applications.

SUMMARY

A composition comprises 5 to 25 weight percent of a poly(phenylene ether); 20 to 40 weight percent of a poly(alkylene terephthalate); 5 to 15 weight percent of a hydrogenated block copolymer of an alkenyl aromatic monomer and a conjugated diene; 0.01 to 2 weight percent of a compatibilizing agent; greater than 5 to 20 weight percent of an arc suppressant comprising a nitrogen-containing compound, a phosphorus-containing compound, or a combination thereof; 5 to 25 weight percent glass fiber; 5 to 20 weight percent of a mineral filler, preferably talc; and 0.1 to 5 weight percent of poly(tetrafluoroethylene); wherein weight percent of each component is based on the total weight of the composition; and wherein the composition comprises less than 4 weight percent of a metal di($C_{1-6}$ alkyl)phosphinate.

A method for the manufacture of the composition comprises melt blending the components of the composition.

Articles comprising the composition are also disclosed.

The above described and other features are exemplified by the following detailed description.

DETAILED DESCRIPTION

The present inventor has unexpectedly discovered that a composition which includes specific amounts of poly(phenylene ether), poly(alkylene terephthalate), hydrogenated block copolymer of an alkenyl aromatic monomer and a conjugated diene, a compatibilizing agent, an arc suppressant, glass fiber, mineral filler, and poly(tetrafluoroethylene) can provide a desirable combination of properties. In order to obtain the desired properties, the composition minimizes or excludes a metal di($C_{1-6}$ alkyl)phosphinate, as will be further discussed herein.

Accordingly, the composition of the present disclosure comprises a poly(phenylene ether). Poly(phenylene ether)s include those comprising repeating structural units having the formula

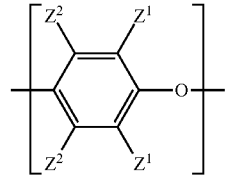

wherein each occurrence of $Z^1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each occurrence of $Z^2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone byproduct is present. The poly(phenylene ether) can be in the form of a homopolymer, a copolymer, a graft copolymer, an ionomer, or a block copolymer, as well as combinations thereof.

In an aspect, the poly(phenylene ether) has an intrinsic viscosity of 0.1 to 1 deciliter per gram measured by Ubbelohde viscometer at 25° C. in chloroform. Within this range, the poly(phenylene ether) intrinsic viscosity can be 0.1 to 0.8 deciliter per gram, or 0.2 to 0.8 deciliter per gram, or 0.1 to 0.6 deciliter per gram, or 0.25 to 0.65 deciliter per gram, or 0.25 to 0.5 deciliter per gram, or 0.25 to 0.4 deciliter per gram.

In an aspect, the poly(phenylene ether) comprises a homopolymer or copolymer of monomers selected from the group consisting of 2,6-dimethylphenol, 2,3,6-trimethylphenol, and combinations thereof. In an aspect, the poly(phenylene ether) comprises a poly(2,6-dimethyl-1,4-phenylene ether) having an intrinsic viscosity of 0.25 to 0.4 deciliter per gram, determined by Ubbelohde viscometer at 25° C. in chloroform. Exemplary poly(phenylene ether) homopolymers are commercially available as, for example, PPO™ 630, 640, and 646 from SABIC, and XYRON™ S201A and S202A from Asahi Kasei Chemicals Corporation.

The composition comprises the poly(phenylene ether) in an amount of 5 to 25 weight percent, or 5 to 20 weight percent, or 5 to 15 weight percent, or 5 to 12 weight percent, or 8 to 12 weight percent, each based on the total weight of the composition.

In addition to the poly(phenylene ether), the composition comprises a poly(alkylene terephthalate). The poly(alkylene terephthalate) can be a poly($C_{2-18}$alkylene terephthalate) or a poly(($C_{1-8}$ alkylene) terephthalate). For example, suitable alkylene groups can include 3-propylene, 1,4-butylene, 1,5-pentylene, 1,6-hexylene, 1,4-cyclohexylene, 1,4-cyclohexanedimethylene, or a combination thereof. In an aspect, the alkylene group is ethylene, 1,4-butylene, or a combination thereof, preferably 1,4-butylene. Accordingly, exemplary poly(alkylene terephthalates) can include poly(ethylene terephthalate) (PET), poly(1,4-butylene terephthalate) (PBT), and poly(n-propylene terephthalate) (PPT). In an aspect, the poly(alkylene terephthalate) is poly(1,4-butylene terephthalate) (PBT). Combinations comprising at least one of the foregoing polyesters can also be used.

The poly(alkylene terephthalate) can be derived from terephthalic acid (or a combination of terephthalic acid and up to 10 mole percent (mol %) of isophthalic acid) and a mixture comprising a linear $C_{2-6}$ aliphatic diol, such as ethylene glycol or 1,4-butylene glycol), and a $C_{6-12}$ cycloaliphatic diol, such as 1,4-cyclohexane diol, 1,4-cyclohexanedimethanol, dimethanol decalin, dimethanol bicyclooctane, 1,10-decane diol, or a combination thereof. The ester units comprising the two or more types of diols can be present in the polymer chain as random individual units or as blocks of the same type of units.

The poly(alkylene terephthalate)s can include up to 10 weight percent, preferably up to 5 weight percent of residues of monomers other than alkylene diols and terephthalic acid. For example, the poly(alkylene terephthalate) can include the residue of isophthalic acid or units derived from an aliphatic acid, such as succinic acid, glutaric acid, adipic acid, pimelic acid, 1,4-cyclohexanedicarboxylic acid, or a combination thereof.

In an aspect, the poly(alkylene terephthalate) can be a poly(1,4-butylene terephthalate) (PBT) obtained by polymerizing a glycol component comprising at least 70 mol %, preferably at least 80 mol %, of tetramethylene glycol (1,4-butanediol), and an acid component comprising at least 70 mol %, preferably at least 80 mol % of terephthalic acid or polyester-forming derivatives thereof. Commercial examples of PBT include VALOX™ 315 and VALOX™ 195 Resin available from SABIC.

The poly(alkylene terephthalate) can include a modified poly(butylene terephthalate), that is derived in part from recycled poly(ethylene terephthalate) PET, e.g., from used soft drink bottles. The PET-derived PBT polyester ("modified PBT") can be derived from a poly(ethylene terephthalate) component such as poly(ethylene terephthalate), a poly(ethylene terephthalate) copolymer, or a combination thereof. The modified PBT can further be derived from biomass-derived 1,4-butanediol. e.g., corn-derived 1,4-butanediol or a 1,4-butanediol derived from a cellulosic material. Unlike conventional molding compositions containing virgin PBT (PBT that is derived from 1,4-butanediol and terephthalic acid monomers), the modified PBT contains units derived from ethylene glycol and isophthalic acid. Use of modified PBT can provide a valuable way to effectively use underutilized scrap PET (from post-consumer or post-industrial streams) in PBT molding compositions, thereby conserving non-renewable resources and reducing the formation of greenhouse gases, e.g., carbon dioxide.

Commercial examples of modified PBT resins include those available under the trade name VALOX iQ Resin, available from SABIC. The modified PBT can be derived from the poly(ethylene terephthalate) component by depolymerization of the poly(ethylene terephthalate) component and polymerization of the depolymerized poly(ethylene terephthalate) component with 1,4-butanediol to provide the modified PBT.

The composition can optionally include a combination of virgin poly(alkylene terephthalate) and modified poly(alkylene terephthalate), including a combination of virgin and modified poly(1,4-butylene terephthalate), the latter obtained from recycled PET.

The poly(alkylene terephthalate) can be present in an amount of 20 to 40 weight percent, based on the total weight of the composition. Within this range, the poly(alkylene terephthalate) can be present in an amount of 25 to 35 weight percent, or 27 to 32 weight percent.

In addition to the poly(phenylene ether) and the poly(alkylene terephthalate), the composition includes a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In an aspect, the hydrogenated block copolymer is a low poly(alkenyl aromatic content) hydrogenated block copolymer in which the poly(alkenyl aromatic) content is 10 to less than 40 weight percent, or 20 to 35 weight percent, or 25 to 35 weight percent, or 30 to 35 weight percent, all based on the weight of the low poly(alkenyl aromatic) content hydrogenated block copolymer. In an aspect, the hydrogenated block copolymer is a high poly(alkenyl aromatic content) hydrogenated block copolymer in which the poly(alkenyl aromatic) content is 40 to 90 weight percent, or 50 to 80 weight percent, or 60 to 70 weight percent, all based on the weight of the high poly(alkenyl aromatic content) hydrogenated block copolymer.

In an aspect, the hydrogenated block copolymer has a weight average molecular weight of 40,000 to 400,000 grams per mole. The number average molecular weight and the weight average molecular weight can be determined by gel permeation chromatography and based on comparison to polystyrene standards. In an aspect, the hydrogenated block copolymer has a weight average molecular weight of 200,000 to 400,000 grams per mole, or 220,000 to 350.000 grams per mole. In an aspect, the hydrogenated block copolymer has a weight average molecular weight of 40,000 to 200,000 grams per mole, or 40,000 to 180,000 grams per mole, or 40,000 to 150,000 grams per mole.

The alkenyl aromatic monomer used to prepare the hydrogenated block copolymer can have the structure

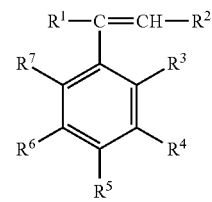

wherein $R^1$ and $R^2$ each independently represent a hydrogen atom, a $C_{1-8}$ alkyl group, or a $C_{2-8}$ alkenyl group; $R^3$ and $R^7$ each independently represent a hydrogen atom, a $C_{1-8}$ alkyl group, a chlorine atom, or a bromine atom; and $R^4$, $R^5$, and $R^6$ each independently represent a hydrogen atom, a $C_{1-8}$ alkyl group, or a $C_{2-8}$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In an aspect, the alkenyl aromatic monomer is styrene.

The conjugated diene used to prepare the hydrogenated block copolymer can be a $C_{4-20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In an aspect, the conjugated diene is 1,3-butadiene, 2-methyl-1,3-butadiene, or a combination thereof. In an aspect, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In an aspect, the aliphatic unsaturation in the (B) block is reduced by at least 50 percent, or at least 70 percent. The arrangement of blocks (A) and (B) includes a linear structure, a grafted structure, and a radial teleblock structure with or without a branched chain. Linear block copolymers include tapered linear structures and non-tapered linear structures. In an aspect, the hydrogenated block copolymer has a tapered linear structure. In an aspect, the hydrogenated block copolymer has a non-tapered linear structure. In an aspect, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In an aspect, the hydrogenated block copolymer is a diblock copolymer, a triblock copolymer, or a combination thereof.

In an aspect, the hydrogenated block copolymer excludes the residue of monomers other than the alkenyl aromatic compound and the conjugated diene. In an aspect, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In an aspect, the hydrogenated block copolymer includes the residue of one or more acid functionalizing agents, such as maleic anhydride. In an aspect, the hydrogenated block copolymer comprises a polystyrene-poly(ethylene-butylene)-polystyrene triblock copolymer.

In an aspect, the hydrogenated block copolymer is a polystyrene-poly(ethylene-butylene)-polystyrene triblock copolymer having a polystyrene content of 10 to 50 weight percent, or 20 to 40 weight percent, or 20 to 35 weight percent, or 25 to 35 weight percent, based on the weight of the polystyrene-poly(ethylene-butylene)-polystyrene triblock copolymer. In these aspects, the polystyrene-poly(ethylene-butylene)-polystyrene triblock copolymer can, optionally, have a weight average molecular weight of 200,000 to 400,000 grams per mole, or 250,000 to 350,000 grams per mole, determined by to size exclusion chromatography using polystyrene standards.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON™ G1701 (having 37 weight percent polystyrene) and G1702 (having 28 weight percent polystyrene); the polystyrene-poly(ethylene-butylene)-polystyrene triblock copolymers available from Kraton Performance Polymers Inc. as KRATON™ G1641 (having 33 weight percent polystyrene), G1650 (having 30 weight percent polystyrene), G1651 (having 33 weight percent polystyrene), and G1654 (having 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ H6140 (having 31 weight percent polystyrene), H6170 (having 33 weight percent polystyrene), H6171 (having 33 weight percent polystyrene), and H6174 (having 33 weight percent polystyrene); and from Kuraray as SEPTON™ 8006 (having 33 weight percent polystyrene) and 8007 (having 30 weight percent polystyrene); polystyrene-poly(ethylene-propylene)-polystyrene (SEPS) copolymers available from Kuraray as SEPTON™ 2006 (having 35 weight percent polystyrene) and 2007 (having 30 weight percent polystyrene); and oil-extended compounds of these hydrogenated block copolymers available from Kraton Performance Polymers Inc. as KRATON™ G4609 (containing 45% mineral oil, and the SEBS having 33 weight percent polystyrene) and G4610 (containing 31% mineral oil, and the SEBS having 33 weight percent polystyrene); and from Asahi as TUFTEC™ H1272 (containing 36% oil, and the SEBS having 35 weight percent polystyrene). Mixtures of two of more hydrogenated block copolymers can be used. In an aspect, the hydrogenated block copolymer comprises a polystyrene poly(ethylene-butylene)-polystyrene triblock copolymer having a weight average molecular weight of at least 100,000 grams per mole, or 200,000 to 400,000 grams per mole.

The composition comprises the hydrogenated block copolymer in an amount of 5 to 15 weight percent, based on the total weight of the composition. Within this range, the hydrogenated block copolymer amount can be 5 to 12 weight percent, or 5 to 10 weight percent.

In addition to the poly(phenylene ether), the poly(alkylene terephthalate), and the hydrogenated block copolymer, the composition comprises a compatibilizing agent. As used herein, the term "compatibilizing agent" refers to a polyfunctional compound that interacts with (at least) the poly(phenylene ether) and the poly(alkylene terephthalate). This interaction can be chemical (for example, grafting) or physical (for example, affecting the surface characteristics of the dispersed phases). In either instance, the resulting blend of poly(alkylene terephthalate) and poly(phenylene ether) can exhibit improved compatibility, particularly as evidenced by, for example, enhanced impact strength, mold knit line strength, or tensile elongation.

Examples of compatibilizing agents that can be employed include, but are not limited to, liquid diene polymers, epoxy compounds, oxidized polyolefin wax, quinones, organosilane compounds, polyfunctional compounds, functionalized poly(phenylene ether)s, or a combination thereof. Compatibilizing agents are further described in U.S. Pat. No. 5,132,365 to Gallucci, and U.S. Pat. Nos. 6,593,411 and 7,226,963 to Koevoets et al.

In an aspect, the compatibilizing agent comprises a polyfunctional compound. In an aspect, polyfunctional compounds that can be employed include in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate, itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (for example, acrylic acid, butenoic acid, methacrylic acid, ethacrylic acid, pentenoic acid, decenoic acids, undecenoic acids, dodecenoic acids, linoleic acid, etc.); esters, acid amides or anhydrides of the foregoing unsaturated carboxylic acids; unsaturated alcohols (for example, alkanols, crotyl alcohol, methyl vinyl carbinol, 4-pentene-1-ol, 1,4-hexadiene-3-ol, 3-butene-1,4-diol, 2,5-dimethyl-3-hexene-2,5-diol, and alcohols of the formula $C_nH_{2n-5}OH$, $C_nH_{2n-7}OH$ and $C_nH_{2n-9}OH$, wherein n is a positive integer from 10-30); unsaturated amines resulting from replacing from replacing the —OH group(s) of the above unsaturated alcohols with —NH$_2$ group(s); and combinations comprising one or more of the foregoing. In an, the compatibilizing agent comprises maleic anhydride, fumaric acid, citric acid, or a combination thereof.

Polyfunctional compatibilizing agent can also have both (a) a group represented by the formula (OR) wherein R is hydrogen or an alkyl, aryl, acyl or carbonyl dioxy group and (b) at least two groups each of which can be the same or different and can be a carboxylic acid, acid halide, anhydride, acid halide anhydride, ester, orthoester, amide, imido, amino, and various salts thereof. Typical of this group of compatibilizing agents are the aliphatic polycarboxylic acids, acid esters, and acid amides represented by the formula

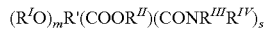

$(R^IO)_mR'(COOR^{II})_n(CONR^{III}R^{IV})_s$ wherein R' is a linear or branched chain, saturated aliphatic hydrocarbon having 2-20, or 2-10 carbon atoms; $R^I$ is hydrogen or an alkyl, aryl, acyl, or carbonyl dioxy group having 1-10, or 1-6, or 1-4 carbon atoms; each $R^{II}$ is independently hydrogen or an alkyl or aryl group having 1-20, or 1-10 carbon atoms; each $R^{III}$ and $R^{IV}$ are independently hydrogen or an alkyl or aryl group having 1-10, or 1-6, or 1-4, carbon atoms; m is equal to 1 and (n+s) is greater than or equal to 2, or equal to 2 or 3, and n and s are each greater than or equal to zero and wherein ($OR^I$) is alpha or beta to a carbonyl group and at least two carbonyl groups are separated by 2-6 carbon atoms. $R^I$, $R^{II}$, $R^{III}$, and $R^{IV}$ cannot be aryl when the respective substituent has less than 6 carbon atoms.

Exemplary polycarboxylic acids include, for example, citric acid, malic acid, and agaricic acid, including the various commercial forms thereof, such as for example, the anhydrous and hydrated acids; and combinations comprising one or more of the foregoing. In an aspect, the compatibilizing agent comprises citric acid. Illustrative of esters useful herein include, for example, acetyl citrate, monostearyl or distearyl citrates, and the like. Exemplary amides include, for example, N,N'-diethyl citric acid amide; N-phenyl citric acid amide; N-dodecyl citric acid amide; N,N'-didodecyl citric acid amide; and N-dodecyl malic acid. Derivatives include the salts thereof, including the salts with amines and the alkali and alkaline metal salts. Exemplary salts include calcium malate, calcium citrate, potassium malate, and potassium citrate.

Polyfunctional compatibilizing agents can also have in the molecule both (a) an acid halide group and (b) at least one carboxylic acid, anhydride, ester, epoxy, orthoester, or amide group, preferably a carboxylic acid or anhydride group. Examples of compatibilizing agents within this group include trimellitic anhydride acid chloride, chloroformyl succinic anhydride, chloroformyl succinic acid, chloroformyl glutaric anhydride, chloroformylglutaric acid, chloroacetylsuccinic anhydride, chloroacetylsuccinic acid, trimellitic acid chloride, and chloroacetylglutaric acid. In some aspects, the compatibilizing agent comprises trimellitic anhydride acid chloride.

In an aspect, the compatibilizing agent can comprise a multifunctional polymeric or oligomeric compatibilizer. In an aspect, the compatibilizing agent can comprise an epoxy-containing polymeric compatibilizer, which includes at least two epoxy groups. Exemplary materials with multiple epoxy groups are styrene-acrylic copolymers and oligomers containing glycidyl groups incorporated as side chains. Several examples of such materials can be found in International Patent Application WO 2003/066704 assigned to Johnson Polymer, LLC, incorporated by reference herein. These materials are based on polymers or oligomers with styrene and (meth)acrylate repeat units that have the desired glycidyl groups incorporated as side chains. A high number of epoxy groups per polymer or oligomer chain can be particularly desirable, for example, at least 10, or at least 15, or at least 20 epoxy groups per polymer or oligomer chain. These compatibilizing agents can have a molecular weight of greater than or equal to 3,000 grams per mole, or greater than or equal to 4,000 grams per mole, or greater than or equal to 6,000 grams per mole. Such polymeric or oligomeric compatibilizing agents can be obtained, for example, from Johnson Polymer, LLC, under the trade name JONCRYL™, for example JONCRYL™ 4368.

The foregoing compatibilizing agents can be added directly to the melt blend or pre-reacted with either or both of the poly(phenylene ether) and the poly(alkylene terephthalate).

In an aspect, the compatibilizing agent comprises fumaric acid, maleic acid, maleic anhydride, citric acid, or a combination thereof. In an aspect, the compatibilizing agent comprises a multifunctional polymeric or oligomeric compatibilizer, preferably an epoxy-containing polymeric compatibilizer, more preferably a copolymer comprising repeating units derived from styrene and a glycidyl (meth)acrylate. In an aspect, the compatibilizing agent can comprise a combination of any one or more of fumaric acid, maleic acid, maleic anhydride, and citric acid and the multifunctional polymeric or oligomeric compatibilizer. In a specific aspect, the compatibilizing agent comprises citric acid and the multifunctional polymeric or oligomeric compatibilizer that is a copolymer comprising repeating units derived from styrene and a glycidyl (meth)acrylate.

The compatibilizing agent is used in an amount of 0.01 to 2 weight percent, based on the total weight of the composition. Within this range, the compatibilizing agent amount can be 0.01 to 1.5 weight percent, or 0.01 to 1 weight percent, 0.1 to 2 weight percent, 0.1 to 1.5 weight percent, 0.1 to 1 weight percent, or 0.1 to 0.75 weight percent.

The composition of the present disclosure further comprises an arc suppressant. Arc suppressants useful in the present disclosure can include compounds that are known to exhibit flame retardant properties. Thus, the arc suppressant additive of the present disclosure can provide arc extinguishing effects as well as flame retardancy to the composition. The arc suppressant can comprise a nitrogen-containing compound (e.g., a nitrogen-containing flame retardant), a phosphorus-containing compound (e.g., a phosphorus-containing flame retardant), or a combination thereof. In an aspect, the arc suppressant is a nitrogen-containing compound. Nitrogen-containing compounds can include those comprising a nitrogen-containing heterocyclic base and a phosphate or pyrophosphate or polyphosphate acid. In an aspect, the nitrogen-containing compound has the formula

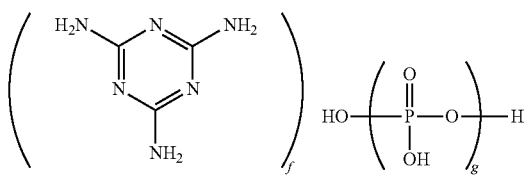

wherein g is 1 to 10,000, and the ratio of f to g is 0.5:1 to 1.7:1, or 0.7:1 to 1.3:1, or 0.9:1 to 1.1:1. It will be understood that this formula includes species in which one or more protons are transferred from the phosphate group(s) to the melamine group(s). When g is 1, the nitrogen-containing compound is melamine phosphate (CAS Reg. No. 20208-95-1). When g is 2, the nitrogen-containing compound is melamine pyrophosphate (CAS Reg. No. 15541 60-3). When g is, on average, greater than 2, the nitrogen-containing compound is a melamine polyphosphate (CAS Reg. No. 56386-64-2). In an aspect, the nitrogen-containing compound is melamine pyrophosphate, melamine polyphosphate, or a mixture thereof. In an aspect in which the nitrogen-containing compound is melamine polyphosphate, g has an average value of greater than 2 to 10,000, or 5 to 1,000, or 10 to 500. In an aspect in which the nitrogen-containing compound is melamine polyphosphate, g has an average value of greater than 2 to 500. Methods for preparing melamine phosphate, melamine pyrophosphate, and melamine polyphosphate are known in the art, and all are commercially available. For example, melamine polyphosphates can be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in U.S. Pat. No. 6,015,510 to Jacobson et al. In an aspect, the nitrogen-containing compound comprises melamine cyanurate.

The nitrogen-containing compound can have a low volatility. For example, in an aspect, the nitrogen-containing compound exhibits less than 1 percent weight loss by thermogravimetric analysis when heated at a rate of 20° C. per minute from 25 to 280° C., or 25 to 300° C., or 25 to 320° C.

In an aspect, the arc suppressant comprises melamine polyphosphate, melamine cyanurate, or a combination thereof. In an aspect, the arc suppressant comprises melamine polyphosphate and melamine cyanurate.

In an aspect, the are suppressant can be an organic phosphorus-containing compound (e.g., an organic phosphorus-containing flame retardant). Exemplary organic phosphorus-containing compounds can include organophosphate esters, a bis(phenoxy)phosphazene, and the like, or a combination thereof.

Exemplary organophosphate ester compounds include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In an aspect, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis (diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), and combinations thereof.

In an aspect the organophosphate ester comprises a bis-aryl phosphate having the formula

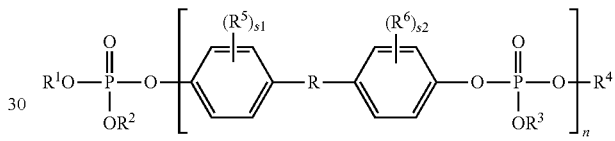

wherein R is independently at each occurrence a $C_{1-12}$ alkylene group; $R^5$ and $R^6$ are independently at each occurrence a $C_{1-5}$ alkyl group; $R^1$, $R^2$, and $R^4$ are independently a $C_{1-12}$ hydrocarbyl group; $R^3$ is independently at each occurrence a $C_{1-12}$ hydrocarbyl group; n is 1 to 25; and s1 and s2 are independently an integer equal to 0, 1, or 2. In an aspect $OR^1$, $OR^2$, $OR^3$ and $OR^4$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In an aspect, the bisphenol comprises bisphenol A.

Exemplary bis(phenoxy)phosphazenes can be oligomeric or polymeric, and it can be cyclic or linear. In an aspect, the bis(phenoxy)phosphazene is cyclic and has the structure

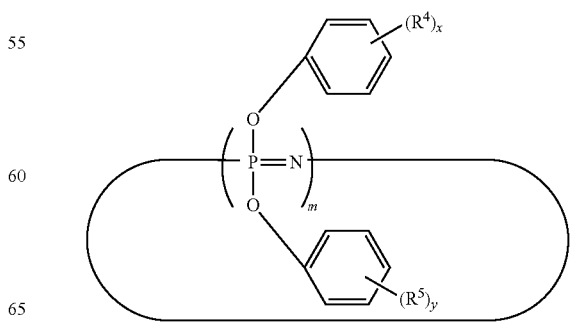

wherein m is an integer of 3 to 25; x and y are each independently 0, 1, 2, 3, 4, or 5; and each occurrence of $R^4$ and $R^5$ is halogen. $C_{1-12}$ alkyl, or $C_{1-12}$ alkoxyl.

In an aspect, the bis(phenoxy)phosphazene is linear and has the structure

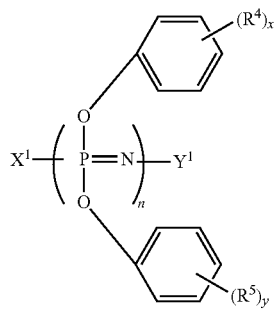

wherein n is an integer from 3 to 10,000; $X^1$ represents a —N=P(OPh)$_3$ group or a —N=P(O)(OPh) group wherein Ph represents a phenyl group; $Y^1$ represents a —P(OPh)$_4$ group or a —P(O)(OPh)$_2$ group; x and y are each independently 0, 1, 2, 3, 4, or 5; and each occurrence of $R^4$ and $R^5$ is halogen. $C_{1-12}$ alkyl, or $C_{1-12}$ alkoxyl.

The arc suppressant is present in the composition in an amount of 5 to 25 weight percent, based on the total weight of the composition. Within this range, the arc suppressant can be present in an amount of greater than 5 to 25 weight percent, or greater than 5 to 20 weight percent, or 7 to 20 weight percent, or 8 to 20 weight percent, or 10 to 20 weight percent, or 12 to 20 weight percent.

As noted above, the arc suppressants useful in the present composition can also function as flame retardants. The composition can optionally exclude flame retardants not specifically described herein. For example, the composition can minimize or exclude the presence of flame retardants such as inorganic flame retardants (e.g., metal hydroxides, metal oxides, polyphosphates, boron salts such as metal borates, inorganic antimony, tin, zinc, molybdenum compounds, red phosphorous), monomeric aromatic phosphates (e.g., of the formula (GO)$_3$P=O, wherein each G is independently an alkyl, cycloalkyl, aryl, alkylarylene, or arylalkylene group having up to 30 carbon atoms, provided that at least one G is an aromatic group), and phosphazenes.

The present inventor has discovered that minimizing or excluding a metal di($C_{1-6}$ alkyl)phosphinate from the composition can be particularly advantageous. Thus, the composition of the present disclosure comprises less than 4 weight percent, or less than 3 weight percent, or less than 2 weight percent, or less than 1 weight percent of a metal di($C_{1-6}$ alkyl)phosphinate. For example, the composition can include 0.1 to less than 4 weight percent, or 0.1 to 3.5 weight percent, or 0.1 to 3 weight percent, or 0.1 to 2.5 weight percent, or 0.1 to 2 weight percent, or 0.1 to 1.5 weight percent, or 0.1 to 1 weight percent of a metal di($C_{1-6}$ alkyl)phosphinate. In an aspect, the composition excludes a metal di($C_{1-6}$ alkyl)phosphinate (i.e., no a metal di($C_{1-6}$ alkyl)phosphinate is added to the composition).

The composition further comprises glass fibers. Exemplary glass fibers include those based on E, A, C, ECR, R, S, D, and NE glasses, as well as quartz. In an aspect, the glass fibers can have a diameter of 2-30 micrometers (μm), or 5-25 μm, or 10-15 μm. In an aspect, the length of the glass fibers before compounding can be 2-7 millimeters (mm), or 3-5 mm. The glass fiber can, optionally, include a so-called adhesion promoter to improve its compatibility with the composition. Adhesion promoters can include, for example, chromium complexes, silanes, titanates, zirco-aluminates, propylene maleic anhydride copolymers, reactive cellulose esters, and the like. Exemplary glass fiber is commercially available from suppliers including, for example, Owens Corning, Nippon Electric Glass, PPG, and Johns Manville.

The glass fiber is present in the composition in an amount of 5 to 25 weight percent. Within this range, the glass fiber can be present in an amount of 5 to 20 weight percent, 5 to 15 weight percent, 5 to 10 weight percent, 10 to 25 weight percent, 10 to 20 weight percent, 10 to 15 weight percent, 15 to 25 weight percent, 15 to 20 weight percent, or 20 to 25 weight percent, each based on the total weight of the composition.

The composition of the present disclosure further includes a mineral filler. Suitable mineral fillers can include, but are not limited to, materials such as mica, clay (kaolin), talc, wollastonite, calcium carbonates (such as chalk, limestone, marble, and synthetic precipitated calcium carbonates), barium ferrite, heavy spar, and the like. Combinations of reinforcing mineral fillers can be used. Mineral fillers can be in the form of plates or flakes having an aspect ratio (average diameter of a circle of the same area as the face of the plate to average thickness) of, e.g., 20 to 200; or needles or fibers having an aspect ratio (average length to average diameter) of, e.g., 5-500. The largest dimension of each particle (e.g., the diameter of a particle in the form of a flat plate) can be 0.1-10 μm, or 0.5-5 μm. The mineral fillers can have an equivalent spherical diameter (based on volume) of 0.1-5 μm, or 0.01-3 μm. In an aspect, the mineral filler is preferably talc.

The mineral filler can be present in the composition in an amount of 5 to 20 weight percent, 5 to 15 weight percent, or 5 to 10 weight percent, each based on the total weight of the composition.

In an aspect, the mineral filler (e.g., talc) can be part of a masterbatch. In an exemplary aspect, the masterbatch includes talc and a polyamide. When used, the masterbatch can comprise the mineral filler component in an amount of 10 to 60 weight percent, or 20 to 60 weight percent, or 30 to 50 weight percent, or 40 to 50 weight percent, each based on the total weight of the masterbatch.

The composition further comprises poly(tetrafluoroethylene). The poly(tetrafluoroethylene) is present in the composition in an amount of 0.1 to 5 weight percent, or 0.1 to 4 weight percent, or 0.5 to 5 weight percent, or 0.5 to 4 weight percent, or 0.5 to 3 weight percent, or 0.5 to 2.5 weight percent, or 1 to 3 weight percent, each based on the total weight of the composition.

In an aspect, the composition can optionally further comprise a polyamide. For example, the mineral filler can be provided in the form of a masterbatch with a polyamide, and thus the resulting composition can include the polyamide. Polyamides, also known as nylons, are characterized by the presence of a plurality of amide (—C(O)NH—) groups and are described in U.S. Pat. No. 4,970,272 to Gallucci. Exemplary polyamides include polyamide-6, polyamide-6,6, polyamide-4,6, polyamide-11, polyamide-12, polyamide-6,10, polyamide-6,12, polyamide 6/6,6, polyamide-6/6,12, polyamide MXD,6 (where MXD is m-xylylene diamine), polyamide-6,T, polyamide-6,I, polyamide-6/6,T, polyamide-6/6,I, polyamide-6,6/6,T, polyamide-6,6/6,I, polyamide-6/6, T/6,I, polyamide-6,6/6,T/6,I, polyamide-6/12/6,T, polyamide-6,6/12/6,T, polyamide-6/12/6,I, polyamide-6,6/12/6, I, or a combination thereof. In an aspect, the polyamide comprises a polyamide-6. In an aspect, the polyamide can have a melting point ($T_m$) greater than or equal to 171° C., as determined, for example, using differential scanning calorimetry (DSC).

Polyamides having an intrinsic viscosity of up to 400 milliliters per gram (mL/g) can be used, or, having a viscosity of 90-350 mL/g, or, having a viscosity of 110-240 mL/g, as measured in a 0.5 wt % solution in 96 wt % sulfuric acid in accordance with ISO 307. The polyamide can have a relative viscosity of up to 6, or a relative viscosity of 1.89-5.43, or a relative viscosity of 2.16-3.93. Relative viscosity is determined according to ISO 307 in a 1 wt % solution in 96 wt % sulfuric acid.

The polyamide can have an amine end group concentration greater than or equal to 35 microequivalents amine end group per gram of polyamide (µeq/g) as determined by titration with HCl. The amine end group concentration can be greater than or equal to 40 µeq/g, or greater than or equal to 45 µeq/g. Amine end group content can be determined by dissolving the polyamide in a solvent, optionally with heat. The polyamide solution is titrated with 0.01 Normal hydrochloric acid (HCl) solution using an indication method. The amount of amine end groups is calculated based the volume of HCl solution added to the sample, the volume of HCl used for the blank, the molarity of the HCl solution, and the weight of the polyamide sample.

When present, the polyamide can be included in the composition in an amount of 0 to 25 weight percent. Within this range, the polyamide can be present in an amount of greater than 0 to 25 weight percent, or greater than 0 to 20 weight percent, greater than 0 to 15 weight percent, or 1 to 15 weight percent, or 5 to 15 weight percent, or 7 to 15 weight percent, or 10 to 15 weight percent, each based on the total weight of the composition.

The composition can optionally further comprise an additive composition. The additive composition comprises one or more additives. The additives can be, for example, stabilizers, mold release agents, lubricants, processing aids, drip retardants, nucleating agents, UV blockers, dyes, pigments, antioxidants, anti-static agents, blowing agents, mineral oil, metal deactivators, antiblocking agents, or a combination thereof. In an aspect, the additive composition can comprise an antioxidant, a lubricant, a thermal stabilizer, an ultraviolet light absorbing additive, a plasticizer, an anti-dripping agent, a mold release agent, an antistatic agent, a dye, a pigment, a laser marking additive, a radiation stabilizer, or a combination thereof. When present, such additives are typically used in a total amount of less than or equal to 5 weight percent, or less than or equal to 3 weight percent, or less than or equal to 2 weight percent, based on the total weight of the composition.

In an aspect, the composition can minimize or exclude other polymers not specifically described herein. For example, the composition can comprise less than 2 weight percent, or less than 1 weight percent, or less than 0.5 weight percent, or less than 0.1 weight percent of any thermoplastic polymer other than the poly(phenylene ether) or the poly(alkylene terephthalate), the hydrogenated block copolymer, a polymeric compatibilizing agent as described herein, the poly(tetrafluoroethylene), and the polyamide, when present. In an aspect, the composition can exclude any thermoplastic polymer other than the foregoing polymers of the present composition.

In an aspect, the composition can comprise 5 to 15 weight percent of the poly(phenylene ether); 25 to 35 weight percent of the poly(butylene terephthalate); 5 to 15 weight percent a styrene-(ethylene-butylene)-styrene triblock copolymer; 0.1 to 1.5 weight percent of the compatibilizing agent; 4 to 10 weight percent of melamine polyphosphate; 4 to 10 weight percent of melamine cyanurate; 5 to 20 weight percent glass fiber; 5 to 20 weight percent talc; 7 to 25 weight percent of a polyamide; 1 to 3 weight percent polytetrafluoroethylene; and wherein the composition excludes a metal di($C_{1-6}$ alkyl)phosphinate. The poly(phenylene ether) can comprise poly(2,6-dimethyl-1,4-phenylene ether) having an intrinsic viscosity of 0.25 to 0.35 deciliter per gram, as determined by Ubbelohde viscometer at 25° C. in chloroform. The poly(alkylene terephthalate) can comprise poly(butylene terephthalate). The styrene-(ethylene-butylene)-styrene triblock copolymer can have a polystyrene content of 20 to 35 weight percent, based on the weight of the polystyrene-poly(ethylene-butylene)-polystyrene triblock copolymer. The compatibilizing agent can comprise citric acid and a copolymer comprising repeating units derived from styrene and a glycidyl (meth)acrylate. The polyamide can comprise polyamide-6.

The composition of the present disclosure comprises 5 to 25 weight percent of a poly(phenylene ether); 20 to 40 weight percent of a poly(alkylene terephthalate); 5 to 15 weight percent of a hydrogenated block copolymer of an alkenyl aromatic monomer and a conjugated diene; 0.01 to 2 weight percent of a compatibilizing agent; greater than 5 to 20 weight percent of an arc suppressant comprising a nitrogen-containing compound, a phosphorus-containing compound, or a combination thereof; 5 to 25 weight percent glass fiber; 5 to 20 weight percent of a mineral filler, preferably talc; and 0.1 to 5 weight percent of poly(tetrafluoroethylene); wherein weight percent of each component is based on the total weight of the composition; and wherein the composition comprises less than 4 weight percent of a metal di($C_{1-6}$ alkyl)phosphinate. The metal di($C_{1-6}$ alkyl) phosphinate can be excluded from the composition. The poly(alkylene terephthalate) can comprise a poly(($C_{1-8}$ alkylene) terephthalate), preferably a poly(ethylene terephthalate), a poly(butylene terephthalate), or a combination thereof, more preferably a poly(butylene terephthalate). The poly(phenylene ether) can comprise poly(2,6-dimethyl-1,4-phenylene ether), preferably having an intrinsic viscosity of 0.1 to 0.6 deciliter per gram, as determined by Ubbelohde viscometer at 25° C. in chloroform. The hydrogenated block copolymer can comprise a styrene-(ethylene-butylene)-styrene triblock copolymer, preferably having a polystyrene content of 20 to 35 weight percent, based on the weight of the polystyrene-poly(ethylene-butylene)-polystyrene triblock copolymer. The compatibilizing agent can comprise fumaric acid, maleic acid, maleic anhydride, citric acid, or a combination thereof, preferably citric acid; a multifunctional polymeric or oligomeric compatibilizer, preferably an epoxy-containing polymeric compatibilizer, more preferably a copolymer comprising repeating units derived from styrene and a glycidyl (meth)acrylate; or both. The composition can optionally further comprise an additive composition comprising an antioxidant, a lubricant, a thermal stabilizer, an ultraviolet light absorbing additive, a plasticizer, an anti-dripping agent, a mold release agent, an antistatic agent, a dye, a pigment, a laser marking additive, a radiation stabilizer, or a combination thereof. The composition can comprise 0 to 25 weight percent of a polyamide. The arc suppressant can comprise a combination of melamine polyphosphate and melamine cyanurate.

The relative amount of each component can be adjusted to provide the desired combination of properties. As is understood by one of skill in the art, the amount of each component is selected such that they total 100 weight percent.

The composition of the present disclosure can exhibit a desirable combination of physical properties. Advantageously, the composition can pass a UL 489 Z-sequence test, in particular a UL 489 dielectric test, as further described in the working examples below. In an aspect, a circuit breaker housing molded from the composition can pass a UL 489 Z-sequence test, in particular a UL 489 dielectric test, as further described in the working examples below. The composition or a molded sample of the composition can have a CTI of 250-399 volts (PLC=2), preferably 400-599 volts (PLC=1), more preferably 600 volts or greater (PLC=0) as determined in accordance with UL 746A. The composition or a molded sample of the composition can have a mean time of arc resistance (HVAR) of 180-239 seconds (PLC=4) or 120-179 seconds (PLC=5) as determined according to ASTM D495. The composition or a molded sample of the composition can have a flexural modulus of greater than 600 MPa, or greater than 640 MPa, or greater than 650 MPa, as determined according to ISO 178. The composition or a molded sample of the composition can have a tensile stress at break of greater than 50 MPa, or greater than 55 MPa, or greater than 60 MPa, as determined according to ISO 527. The composition or a molded sample of the composition can have a specific gravity of less than 1.48, or less than 1.45, or less than 1.44, or 1.35 to less than 1.45, as determined according to ASTM D792-10.

The composition of the present disclosure can be manufactured, for example, by melt blending the components of the composition. The components of the composition can be mixed or blended using common equipment such as ribbon blenders, HENSCHEL™ mixers, BANBURY™ mixers, drum tumblers, and the like, and the blended composition can subsequently be melt-blended or melt-kneaded. The melt-blending or melt-kneading can be performed using common equipment such as single-screw extruders, twin-screw extruders, multi-screw extruders, co-kneaders, and the like. For example, the present composition can be prepared by melt-blending the components in a twin-screw extruder at a temperature of 270 to 310° C., or 280 to 300° C. The extrudate can be immediately quenched in a water bath and pelletized. The pellets so prepared can be one-fourth inch long or less as desired. Such pellets can be used for subsequent molding, shaping, or forming.

Shaped, formed, or molded articles comprising the composition represent another aspect of the present disclosure. The composition can be molded into useful shaped articles by a variety of methods, such as injection molding, extrusion, rotational molding, blow molding and thermoforming. Some examples of articles include computer and business machine housings such as housings for monitors, handheld electronic device housings such as housings for cell phones, electrical connectors, and components of lighting fixtures, ornaments, home appliances, roofs, greenhouses, sunrooms, swimming pool enclosures, and the like. In an aspect, the article is an extruded article, a molded article, pultruded article, a thermoformed article, a foamed article, a layer of a multi-layer article, a substrate for a coated article, or a substrate for a metallized article. In an aspect, the composition can be particularly useful in electrical components such as a molded circuit breaker or a molded circuit breaker housing. In an aspect, the composition can be used in a molded miniature circuit breaker or a molded miniature circuit breaker housing.

As described herein, the present inventor has unexpectedly discovered that a composition including specific amounts of a poly(phenylene ether), a poly(alkylene terephthalate), a hydrogenated block copolymer, a compatibilizing agent, an arc suppressant, glass fibers, a mineral filler, and poly(tetrafluoroethylene) can provide certain advantageous properties. In particular, when a metal di($C_{1-6}$ alkyl) phosphinate is minimized or excluded from the composition, a desirable combination of properties are obtained. Therefore, a significant improvement is provided by the present disclosure, specifically as it relates to molded circuit breakers (including molded miniature circuit breakers) and housings thereof.

This disclosure is further illustrated by the following examples, which are non-limiting.

EXAMPLES

Materials used for the following examples are described in Table 1.

TABLE 1

| Component | Description | Supplier |
|---|---|---|
| PPE | Poly(2,6-dimethyl-1,4-phenylene ether), CAS Reg. No. 25134-01-4, having an intrinsic viscosity of 0.30 deciliter per gram as measured in chloroform at 25° C. and a weight average molecular weight of 45,000 grams per mole relative to polystyrene standards; obtained as NORYL ™ PPO 630 | SABIC |
| PBT | Poly(1,4-butylene terephthalate), CAS Reg. No. 26062-94-2, having an intrinsic viscosity of 1.2 deciliters/gram as measured at 30° C. in a 1:1 (w/w) solution of phenol: 1,1,2,2-tetrachloroethane, and having 38 meq/kg of COOH; obtained as VALOX ™ 315 | SABIC |
| SEBS | Polystyrene-poly(ethylene-butylene)-polystyrene triblock copolymer, CAS Reg. No. 66070-58-4 having a polystyrene content of 27.7-30.7 wt %; obtained as KRATON ™ G1650 | KRATON Performance Polymers Inc. |
| DEPAL | Aluminum tris(diethyl phosphinate), CAS Reg. No. 225789-38-8; obtained as EXOLIT ™ OP1230 | CLARIANT |
| MPP | Melamine polyphosphate, CAS Reg. No. 56386-64-2, obtained as MELAPUR ™ 200 | BASF Corp. |
| MC | Melamine cyanurate, available as MELAPUR ™ MC25 | BASF Corp. |
| SHPP | Sodium hydrogen pyrophosphate, CAS Reg. No. 7758-16-9 | ULRICH CHEMICAL |
| GF-1 | Chopped glass fibers having a diameter of 10 micrometers, a pre-compounded length of 3.2 millimeters; obtained as CHOPVANTAGE ™ 3540 | PPG Industries |
| GF-2 | Flat glass fibers having a length of 3.0 millimeters, a cross-sectional oblateness, 4 (=irregular cross-sectional short diameter of 7 μm, irregular cross-sectional long diameter of 28 μm); obtained as CSG 3PA-830 | Nitto Boseki Co., Ltd. |

TABLE 1-continued

| Component | Description | Supplier |
|---|---|---|
| Talc | A masterbatch of 45 wt % talc and 55 wt % high fluidity nylon 6 (PA6); obtained as 26300-A1-000; the talc is untreated and has a median particle size of 3.2 μm | Americhem |
| CA | Citric acid, CAS Reg. No. 77-92-9 | Intercontinental |
| Comp | A polymeric compatibilizer having an epoxy content of 3500 meq/kg, a number average molecular weight of 6800 grams per mole, and an average of 24 pendant epoxy groups per molecule; obtained as JONCRYL ™ 4368 | Johnson Polymers |
| PHBPP | Pentaerythritol 3-(4-hydroxy-3,5-di-tert-butylphenyl)propionate (1:4), CAS Reg. No. 6683-19-8; obtained as IRGANOX 1010 | BASF Corp. |
| PTFE | Polytetrafluoroethylene, obtained as ZONYL ™ MP1300 | Dupont |
| CB | Carbon black, obtained as VULCAN ™ 9A32 | Cabot |

The compositions of each of the examples were prepared by blending all components with the exception of the PBT, glass fibers and talc. The blends were compounded on a Werner-Pfleiderer 30 mm co-rotating extruder, where the PBT, glass fibers and talc were fed separately downstream of the blend. The extruder temperature settings (upstream to downstream) were 240-290-290-270-270-270-270-270-280° C. The screw rotation rate was 280 revolutions per minute (rpm).

Parts were molded using an 85 Van Dorn injection molding machine with temperature settings of 265-265-265-265° C. (from throat to nozzle) and a mold temperature of 80° C. Prior to molding the pellets were pre-dried at 110° C. for 2-4 hours.

Properties of the molded parts were tested according to the following standards. Flexural modulus and flexural strength were determined in accordance with ISO 178 using a multi-purpose ISO 3167 Type A specimen. The heat distortion temperature (HDT) was determined in accordance with the ISO-75 standard, using the flat side of 4 mm thick ISO bars and a load of 1.8 MPa (A/f). Tensile modulus was determined according to ISO 527 using a multi-purpose ISO 3167 Type A specimen. Tensile stress and strain at break were determined according to ISO 527 using a multi-purpose ISO 3167 Type A specimen and a testing speed of 5 millimeters/minute. Specific gravity was determined according to ASTM D792-10. Melt-volume flow rate (MVR) was determined according to ISO 1133 at 250° C. and 280° C. using a 5 kilogram load.

High voltage arc resistance (HVAR) was determined according to ASTM D495, and is reported in terms of performance level categories (PLC). In accordance with ASTM D-495, performance is expressed as the number of seconds that a material resists the formation of a surface conducting path when subjected to an intermittently occurring are of high voltage, low current characteristics. The results of testing the nominal 3 mm thickness are considered representative of the material's performance in any thickness. A mean time of arc resistance of 420 seconds or longer is assigned a PLC of 0; a mean time of arc resistance of 360-419 seconds is assigned a PLC of 1; a mean time of are resistance of 300-359 seconds is assigned a PLC of 2; a mean time of arc resistance of 240-299 seconds is assigned a PLC of 3; a mean time of arc resistance of 180-239 seconds is assigned a PLC of 4; a mean time of arc resistance of 120-179 seconds is assigned a PLC of 5; a mean time of arc resistance of 60-119 seconds is assigned a PLC of 6; and a mean time of arc resistance of less than 60 seconds is assigned a PLC of 7. Particularly useful formulations can have a PLC of 5 or less.

Comparative tracking index (CTI) was determined in accordance with UL 746A, and is reported in terms of PLC. Performance is expressed as the voltage which causes tracking after 50 drops of 0.1% ammonium chloride solution have fallen on the material. The results of testing the nominal 3 mm thickness are considered representative of the material's performance in any thickness. A CTI of 600 Volts or greater is assigned a PLC of 0; a CTI of 400-599 Volts is assigned a PLC of 1; a CTI of 250-399 Volts is assigned a PLC or 2; a CTI of 174-249 Volts is assigned a PLC of 3; a CTI of 100-174 Volts is assigned a PLC of 4; and a CTI of less than 100 Volts is assigned a PLC of 5. Particularly useful formulations can have a PLC of 2 or less.

Dielectric integrity and interrupting ability were tested in accordance with the Underwriters Laboratory (UL) 489 standard using a circuit breaker housing molded from the composition. For the interrupting ability test, the circuit breaker must operate at 200% at a minimum of 5,000 amps and a power factor of 0.4-0.5 after 3 short circuit operations. After the interrupting ability test, the dielectric withstand test was performed on the same circuit breaker. To pass the dielectric test, the circuit breaker must withstand one minute of a voltage of 1,000 V plus two times the rating of the breaker for one minute. The UL 489 standard requires that a circuit breaker withstand a dielectric test at a voltage level of 1000 volts plus two times the rating of the breaker for one minute between 1) line and load terminals with circuit breaker in open, tripped, and off positions; 2) terminals of opposite polarity with circuit breaker closed; 3) live parts and the overall enclosure with circuit breaker open and closed. Compositions that passed the interrupting ability and dielectric withstand testing are marked as acceptable "A", whereas compositions that did not pass the interrupting ability and dielectric withstand testing are marked as unacceptable "U".

Exemplary compositions are described in Table 2. The amount of each component is provided in weight percent, based on the total weight of the composition. Units for flexural modulus and strength are MPa. HDT is given in ° C. Tensile modulus and stress are provided in MPa. Tensile strain at break is given in percent (%). MVR is given in cm³/10 minutes. PLC ratings as described above are given for HVAR and CTI. UL489-Z sequence testing results are given as "acceptable" ("A") or "unacceptable" ("U") as described above.

TABLE 2

| | E1* | E2* | E3* | E4* | E5* | E6* | E7* | E8* | E9* | E10* | E11* | E12* | E13 | E14* |
|---|---|---|---|---|---|---|---|---|---|---|---|---|---|---|
| Component | | | | | | | | | | | | | | |
| PPE | 10.0 | 10.0 | 10.0 | 10.0 | 10.0 | 10.0 | 10.0 | 10.0 | 10.0 | 10.0 | 10.0 | 10.0 | 10.0 | — |
| PBT | 51.5 | 47.4 | 35.1 | 38.1 | 38.1 | 38.0 | 35.0 | 31.0 | 35.0 | 35.0 | 33.7 | 29.7 | 30.7 | 56.7 |
| SEBS | 7.0 | 7.0 | 7.0 | 7.0 | 7.0 | 7.0 | 7.0 | 7.0 | 7.0 | 7.0 | 7.0 | 7.0 | 7.0 | — |
| CA | 0.3 | 0.3 | 0.3 | 0.3 | 0.3 | 0.3 | 0.3 | 0.3 | 0.3 | 0.3 | 0.3 | 0.3 | 0.3 | — |
| DEPAL | 9.0 | 11.0 | 11.0 | 9.5 | 9.0 | 9.0 | 8.0 | 11.0 | 8.0 | 5.0 | 5.0 | 5.0 | | 12.5 |
| MPP | 2.0 | 4.0 | 4.0 | 2.5 | | 2.0 | 5.0 | 6.0 | | 4.0 | 8.0 | 6.0 | 8.0 | 5.5 |
| MC | | | | | | | | | | 4.0 | | 6.0 | 8.0 | |
| SHPP | | | | | 3.0 | | | | 5.0 | | | | | |
| PHBPP | 0.2 | 0.2 | 0.2 | 0.2 | 0.2 | 0.2 | 0.2 | 0.2 | 0.2 | 0.2 | 0.2 | 0.2 | 0.2 | 0.2 |
| PTFE | | | | 0.1 | | 1.0 | 1.2 | 1.2 | 1.2 | 1.2 | 2.0 | 2.0 | 2.0 | — |
| Comp | | | | | | 0.2 | 0.2 | 0.3 | 0.2 | 0.2 | 0.2 | 0.2 | 0.2 | |
| GF-1 | 20.0 | | 10.0 | 10.0 | 10.0 | 10.0 | 10.0 | 10.0 | 10.0 | 10.0 | 10.0 | 10.0 | 10.0 | 25.0 |
| GF-2 | | 20.0 | | | | | | | | | | | | — |
| Talc | | | 22.2 | 22.2 | 22.2 | 22.2 | 23.0 | 23.0 | 23.0 | 23.0 | 23.5 | 23.5 | 23.5 | — |
| Pigment | 0.1 | 0.2 | 0.2 | 0.1 | 0.2 | 0.1 | 0.1 | 0.1 | 0.1 | 0.1 | 0.1 | 0.1 | 0.1 | 0.1 |
| Properties | | | | | | | | | | | | | | |
| Flex. Modulus | 6038 | 6483 | 5848 | 5501 | 5834 | 5690 | 6245 | 5761 | 5823 | 5845 | 6178 | 6409 | 6567 | 9600 |
| Flex Strength | 126 | 113 | 83 | 86 | 88 | 92 | 80 | 78 | 83 | 67 | 85 | 79 | 96 | 178 |
| HDT (1.8 MPa) | 179 | 186 | 172 | 175 | 175 | 176 | 180 | 178 | 177 | 184 | 173 | 175 | 182 | 209 |
| Tensile Modulus | 6373 | 6581 | 5757 | 5706 | 5919 | 5860 | 6482 | 5944 | 5979 | 6064 | 6086 | 6307 | 6542 | 10100 |
| Tens. Stress at Brk | 78 | 70 | 50 | 55 | 53 | 61 | 54 | 53 | 54 | 48 | 52 | 48 | 62 | 111 |
| Tens. Strain at Brk | 3 | 2 | 1 | 2 | 1 | 2 | 1 | 1 | 1 | 1 | 1 | 1 | 1 | 2 |
| Specific Gravity | 1.39 | 1.39 | 1.38 | 1.37 | 1.38 | 1.37 | 1.41 | 1.39 | 1.42 | 1.41 | 1.41 | 1.42 | 1.43 | 1.53 |
| MVR (280° C. 5 kg) | 27 | 41 | 18 | 27 | 21 | 18 | 21 | 54 | 51 | 42 | 26 | 21 | 17 | NA |
| HVAR (UL495) | 5 | 6 | 5 | 5 | 5 | 5 | 4 | 4 | 4 | 5 | 4 | 4 | 4 | 5 |
| CTI | 1 | 2 | 0 | 0 | 1 | 0 | 0 | 0 | 1 | 0 | 0 | 0 | 0 | 0 |
| UL489-Z sequence | | | | | | | | | | | | | | |
| Interrupting Ability Test | A | A | A | A | A | A | A | A | A | A | A | A | A | A |
| Dielectric Withstand Test | U | U | U | U | U | U | U | U | U | U | U | U | A | U |

*indicates a comparative example

The data in Table 2 shows that PPE/PBT reinforced compositions can provide a desirable combination of physical properties as well as satisfy the testing requirements of a UL489 dielectric test when a metal dialkylphosphinate flame retardant (e.g., "DEPAL") is minimized or excluded from the composition (i.e., present in an amount of less than 4 weight percent). Table 2 also shows that when a PTFE component is included in the composition, the UL489 dielectric testing requirements are satisfied.

This disclosure further encompasses the following aspects.

Aspect 1: A composition comprising: 5 to 25 weight percent of a poly(phenylene ether); 20 to 40 weight percent of a poly(alkylene terephthalate); 5 to 15 weight percent of a hydrogenated block copolymer of an alkenyl aromatic monomer and a conjugated diene; 0.01 to 2 weight percent of a compatibilizing agent; 5 to 25 weight percent of an arc suppressant comprising a nitrogen-containing compound, a phosphorus-containing compound, or a combination thereof; 5 to 25 weight percent glass fiber; 5 to 20 weight percent of a mineral filler, preferably talc; and 0.1 to 5 weight percent of poly(tetrafluoroethylene); wherein weight percent of each component is based on the total weight of the composition; and wherein the composition comprises less than 4 weight percent of a metal di($C_{1-6}$ alkyl)phosphinate.

Aspect 2: The composition of aspect 1, wherein a circuit breaker housing molded from the composition passes a UL 489 Z-sequence test.

Aspect 3: The composition of aspects 1 or 2, wherein a metal di($C_{1-6}$ alkyl)phosphinate is excluded from the composition.

Aspect 4: The composition of any of aspects 1 to 3, wherein the poly(alkylene terephthalate) comprises a poly(($C_{1-8}$ alkylene) terephthalate), preferably a poly(ethylene terephthalate), a poly(butylene terephthalate), or a combination thereof, more preferably a poly(butylene terephthalate).

Aspect 5: The composition of any of aspects 1 to 4, wherein the poly(phenylene ether) comprises poly(2,6-dimethyl-1,4-phenylene ether), preferably having an intrinsic viscosity of 0.1 to 0.6 deciliter per gram, as determined by Ubbelohde viscometer at 25° C. in chloroform.

Aspect 6: The composition of any of aspects 1 to 5, wherein the hydrogenated block copolymer comprises a styrene-(ethylene-butylene)-styrene triblock copolymer, preferably having a polystyrene content of 20 to 35 weight percent, based on the weight of the polystyrene-poly(ethylene-butylene)-polystyrene triblock copolymer.

Aspect 7: The composition of any of aspects 1 to 6, wherein the compatibilizing agent comprises fumaric acid, maleic acid, maleic anhydride, citric acid, or a combination thereof, preferably citric acid; a multifunctional polymeric or oligomeric compatibilizer, preferably an epoxy-containing polymeric compatibilizer, more preferably a copolymer comprising repeating units derived from styrene and a glycidyl (meth)acrylate; or both.

Aspect 8: The composition of any of aspects 1 to 7, further comprising an additive composition comprising an antioxidant, a lubricant, a thermal stabilizer, an ultraviolet light absorbing additive, a plasticizer, an anti-dripping agent, a mold release agent, an antistatic agent, a dye, a pigment, a laser marking additive, a radiation stabilizer, or a combination thereof.

Aspect 9: The composition of any of aspects 1 to 8, wherein the composition comprises 0 to 25 weight percent of a polyamide.

Aspect 10: The composition of any of aspects 1 to 9, wherein the arc suppressant comprises melamine polyphosphate, melamine cyanurate, or a combination thereof, preferably melamine polyphosphate and melamine cyanurate.

Aspect 11: The composition of aspect 1, comprising 5 to 15 weight percent of the poly(phenylene ether); 25 to 35 weight percent of the poly(alkylene terephthalate); 5 to 15 weight percent a styrene-(ethylene-butylene)-styrene triblock copolymer; 0.1 to 1.5 weight percent of the compatibilizing agent; 4 to 10 weight percent of melamine polyphosphate; 4 to 10 weight percent of melamine cyanurate; 5 to 20 weight percent glass fiber; 5 to 20 weight percent talc; 7 to 25 weight percent of a polyamide; 1 to 3 weight percent polytetrafluoroethylene; and wherein the composition excludes a metal di($C_{1-6}$ alkyl)phosphinate.

Aspect 12: The composition of aspect 11, wherein the poly(phenylene ether) comprises poly(2,6-dimethyl-1,4-phenylene ether) having an intrinsic viscosity of 0.25 to 0.35 deciliter per gram, as determined by Ubbelohde viscometer at 25° C. in chloroform; the poly(alkylene terephthalate) comprises poly(butylene terephthalate); the styrene-(ethylene-butylene)-styrene triblock copolymer has a polystyrene content of 20 to 35 weight percent, based on the weight of the polystyrene-poly(ethylene-butylene)-polystyrene triblock copolymer; the compatibilizing agent comprises citric acid and a copolymer comprising repeating units derived from styrene and a glycidyl (meth)acrylate; and the polyamide comprises polyamide-6.

Aspect 13: A method for the manufacture of the composition of any of the preceding aspects, the method comprising melt blending the components of the composition.

Aspect 14: An article comprising the composition of any of aspects 1 to 12.

Aspect 15: The article of aspect 14, wherein the article is a molded circuit breaker or a molded circuit breaker housing.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some aspects", "an aspect", and so forth, means that a particular element described in connection with the embodiment is included in at least one aspect described herein, and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC═CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(═O)$_2$-alkyl), a C$_{6-12}$ aryl sulfonyl (—S(═O)$_2$-aryl), a thiol (—SH), a thiocyano (—SCN), a tosyl (CH$_3$C$_6$H$_4$SO$_2$—), a C$_{3-12}$ cycloalkyl, a C$_{2-12}$ alkenyl, a C$_{5-12}$ cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition comprising:
   5 to 25 weight percent of a poly(phenylene ether);
   20 to 40 weight percent of a poly(alkylene terephthalate);
   5 to 15 weight percent of a hydrogenated block copolymer of an alkenyl aromatic monomer and a conjugated diene;
   0.01 to 2 weight percent of a compatibilizing agent;
   5 to 25 weight percent of an arc suppressant comprising a nitrogen-containing compound, a phosphorus-containing compound, or a combination thereof;
   5 to 25 weight percent glass fiber;
   5 to 20 weight percent of a mineral filler; and
   0.1 to 5 weight percent of poly(tetrafluoroethylene);
   wherein weight percent of each component is based on the total weight of the composition; and
   wherein the composition comprises less than 4 weight percent of a metal di(C$_{1-6}$ alkyl)phosphinate.

2. The composition of claim 1, wherein a circuit breaker housing molded from the composition passes a UL 489 Z-sequence test.

3. The composition of claim 1, wherein a metal di(C$_{1-6}$ alkyl)phosphinate is excluded from the composition.

4. The composition of claim 1, wherein the poly(alkylene terephthalate) comprises a poly((C$_{1-8}$ alkylene) terephthalate).

5. The composition of claim 1, wherein the poly(phenylene ether) comprises poly(2,6-dimethyl-1,4-phenylene ether).

6. The composition of claim 1, wherein the hydrogenated block copolymer comprises a styrene-(ethylene-butylene)-styrene triblock copolymer.

7. The composition of claim 1, wherein the compatibilizing agent comprises
   fumaric acid, maleic acid, maleic anhydride, citric acid, or a combination thereof;
   a multifunctional polymeric or oligomeric compatibilizer; or both.

8. The composition of claim 1, further comprising an additive composition comprising an antioxidant, a lubricant, a thermal stabilizer, an ultraviolet light absorbing additive, a plasticizer, an anti-dripping agent, a mold release agent, an antistatic agent, a dye, a pigment, a laser marking additive, a radiation stabilizer, or a combination thereof.

9. The composition of claim 1, wherein the composition comprises 0 to 25 weight percent of a polyamide.

10. The composition of claim 1, wherein the arc suppressant comprises melamine polyphosphate, melamine cyanurate, or a combination thereof.

11. The composition of claim 1, comprising
    5 to 15 weight percent of the poly(phenylene ether);
    25 to 35 weight percent of the poly(alkylene terephthalate);
    5 to 15 weight percent a styrene-(ethylene-butylene)-styrene triblock copolymer;
    0.1 to 1.5 weight percent of the compatibilizing agent;
    4 to 9 weight percent of melamine polyphosphate;
    4 to 9 weight percent of melamine cyanurate;
    5 to 20 weight percent glass fiber;
    5 to 15 weight percent talc;
    7 to 25 weight percent of a polyamide;
    1 to 3 weight percent polytetrafluoroethylene; and
    wherein the composition excludes a metal di(C$_{1-6}$ alkyl) phosphinate.

12. The composition of claim 11, wherein
    the poly(phenylene ether) comprises poly(2,6-dimethyl-1,4-phenylene ether) having an intrinsic viscosity of 0.25 to 0.35 deciliter per gram, as determined by Ubbelohde viscometer at 25° C. in chloroform;
    the poly(alkylene terephthalate) comprises poly(butylene terephthalate);
    the styrene-(ethylene-butylene)-styrene triblock copolymer has a polystyrene content of 20 to 35 weight percent, based on the weight of the polystyrene-poly(ethylene-butylene)-polystyrene triblock copolymer;
    the compatibilizing agent comprises citric acid and a copolymer comprising repeating units derived from styrene and a glycidyl (meth)acrylate; and
    the polyamide comprises polyamide-6.

13. A method for the manufacture of the composition of claim 1, the method comprising melt blending the components of the composition.

14. An article comprising the composition of claim 1.

15. The article of claim 14, wherein the article is a molded circuit breaker or a molded circuit breaker housing.

16. The composition of claim 1, wherein the mineral filler comprises talc.

17. The composition of claim 1, wherein the poly(alkylene terephthalate) comprises a poly(ethylene terephthalate), a poly(butylene terephthalate), or a combination thereof.

18. The composition of claim 1, wherein the compatibilizing agent comprises citric acid;
   a copolymer comprising repeating units derived from styrene and a glycidyl (meth)acrylate;
   or both.

19. The composition of claim 1, wherein the arc suppressant comprises melamine polyphosphate and melamine cyanurate.

20. The composition of claim 1, wherein the poly(phenylene ether) comprises poly(2,6-dimethyl-1,4-phenylene ether) having an intrinsic viscosity of 0.1 to 0.6 deciliter per gram, as determined by Ubbelohde viscometer at 25° C. in chloroform.

* * * * *